Nov. 10, 1931.  W. D. HILL  1,831,111
HANDLE FOR COOKING UTENSILS AND THE LIKE
Filed April 5, 1930
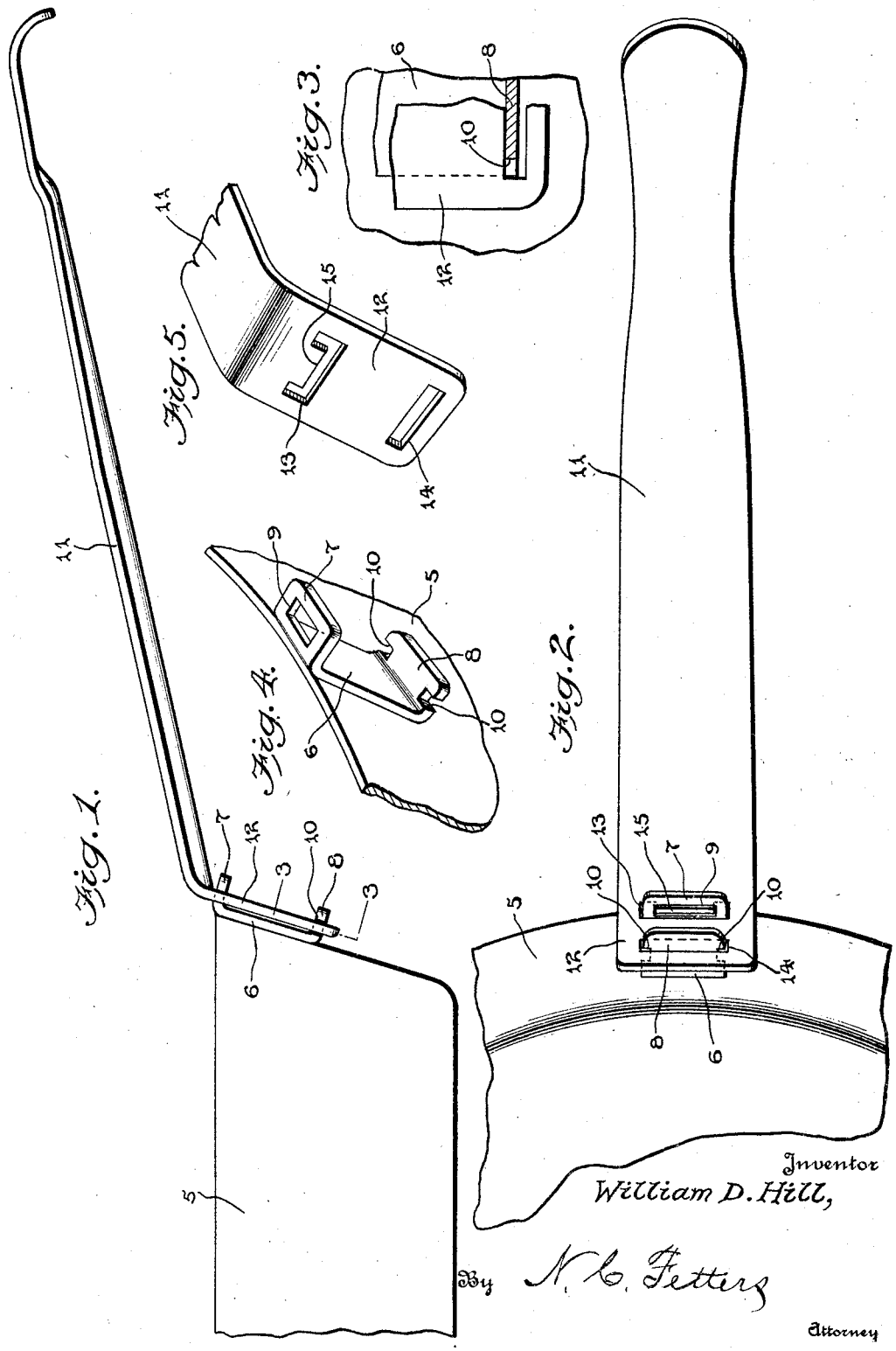
Inventor
William D. Hill,
By N. C. Fetters
Attorney Patented Nov. 10, 1931

1,831,111

UNITED STATES PATENT OFFICE

WILLIAM D. HILL, OF ALLIANCE, OHIO

HANDLE FOR COOKING UTENSILS AND THE LIKE

Application filed April 5, 1930. Serial No. 441,889.

This invention relates to improvements in handles for cooking utensils and the like, and more especially to novel means for detachably connecting a handle to a utensil.

The primary object of the invention is to improve means such as are employed in detachably connecting a handle to a number of cooking utensils, each one of which is provided with a part of the connecting means.

Another object is to furnish a handle of this character which may be readily attached to a utensil even by an unskilled person, and one which will allow a utensil to be tipped in opposite directions without liability of the handle detaching itself from the utensil.

A still further object is to furnish a structure of this character, which may be made of sheet metal, and which can be inexpensively manufactured.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a side elevation of a cooking utensil having a handle detachably connected to the same by my improved means.

Fig. 2 is a bottom plan view of the same.

Fig. 3 is a sectional view of a detail on the line 3—3 of Fig. 1.

Fig. 4 is a perspective view of a portion of the utensil and my improved clip.

Fig. 5 is a similar view of a portion of the handle.

In the drawings, 5 designates a portion of a cooking utensil or the like, to which a clip 6, preferably of sheet metal, is attached by welding, riveting or otherwise. The clip is preferably placed on the outer wall of the utensil adjacent to the upper edge of the latter, and it is provided with an upper ear 7 and a lower ear 8, the former being provided with a slot 9, and the latter having notches 10 in its opposite side edges.

A handle 11 also preferably formed of sheet metal, has one of its ends bent at an angle to the main portion of the handle to form an extension 12, which is provided with a C-shaped upper slot 13 and an ordinary rectangular lower slot 14. The C-shaped slot forms a tongue 15 which is of a width substantially the same as that of the slot 9, so that when the ear 7 is inserted through the slot 13, and the handle is pushed downwardly, the tongue 15 will interlock with the slot 9 of the clip. At this time the handle may be rocked on the upper edge of the clip to permit the ear 8 to be projected through the slot 14. Then, when the handle is lifted, the lower edge of the slot 14 will impinge against the lower surface of the ear 8, and thus cause the utensil to rise with the handle. At such time, the tongue 15 will cooperate with the slot 9 to prevent the handle from unduly rocking on the utensil or vice versa.

The slot 14 is of a length equal to the length of the ear 8, and the notches 10 are provided to receive the end walls of the slot 14, when the handle is turned for the purpose of tipping the utensil laterally. At such time, one or the other of the end walls of the slot 14 will move into one or the other of the notches 10, and prevent detachment of the handle during the tipping operation. It will thus be understood that the function of the notches 10 is to hold the utensil to the handle when it is being tipped as in emptying it of its contents. In this case, the handle having a slight sidewise or pivotal movement, will engage in one or the other of the notches, and the utensil can be almost entirely inverted without becoming detached from the handle.

From the foregoing it is believed that the construction, operation and advantages of the invention may be readily understood, and it is apparent that changes may be made in the details disclosed, without departing from the spirit of the invention, as expressed in the claims.

What I claim and desire to secure by Letters Patent is:

1. In combination, a utensil member and a handle member, one of said members being provided with a plurality of projecting ears, and the other member having slots through which the ears extend, one of said ears being slotted, and a tongue integral with the slotted members projecting into the last mentioned slot.

2. In a structure of the character described, a utensil, a clip fixedly secured to the utensil and having a plurality of ears, a handle having closed slots to receive said ears, one of the ears being slotted, and a tongue integral with said handle projecting into the slot of the slotted ear, the other ear being provided with oppositely disposed notches to permit lateral shifting of the handle.

3. In a structure of the character described, a utensil, a U-shaped clip fixed to the outer wall of said utensil and provided with upper and lower ears, the upper ear being provided with a slot, and the lower ear having notches in its ends, a handle having an extension arranged at an angle to the main portion of the handle, said extension being provided with slots to receive said ears, and a tongue on the extension projecting downwardly and interlocking with the slot of the slotted tongue.

In testimony whereof, I have signed this specification.

WILLIAM D. HILL.